INVENTOR.
FREDERICK J. KOVAC
BY GROVER W. RYE

*J.B. Holden*
ATTORNEY

United States Patent Office 3,233,648
Patented Feb. 8, 1966

3,233,648
TIRE CONTAINING HIGH TWIST
REINFORCEMENT
Frederick J. Kovac, Akron, and Grover W. Rye, Cuyahoga Falls, Ohio, assignors to The Goodyear Tire & Rubber Company, Akron, Ohio, a corporation of Ohio
Filed Jan. 2, 1964, Ser. No. 335,302
8 Claims. (Cl. 152—359)

This invention relates to pneumatic tires and in particular to the construction of the cord with the carcass of the tire.

The present day construction of pneumatic tires is accomplished by placing several layers or plies of reinforcement cord within the carcass. The cords of the individual plies are arranged perpendicular to the plane of the carcass, this creating a radial ply tire, or the reinforcement cords are angularly disposed across the carcass of the body to form the conventional cross ply tire. Also, in accordance with conventional tire building practice, the several plies of fabric that form the carcass are each coated with a thin rubber layer so that each individual cord is embedded in rubber, thus preventing contact between adjacent cords in a given ply or between adjoining cords in the superposed plies.

Heretofore the cord reinforcement utilized in ordinary pneumatic tires has been fabricated from two or more twisted yarns that have in turn been combined into a single strength carrying cord. The above method of fabricating a tire cord has been found satisfactory in most instances, however, it has been found desirable to have a reinforcement element that will provide a greater range of physical characteristics. Increased performance in the reinforcement material is necessary since pneumatic tires are presently enjoying a greater life span than was heretofore possible. The rubber stock has been compounded so that extra mileage is the general rule rather than the exception. Also road surfaces are constantly improving, thus reducing the overall tire wear and prolonging the duration over which the carcass is used. The various technological advances that have prolonged the life of the pneumatic tire have also imposed an extra burden upon the reinforcement material contained within the tire carcass. It has, therefore, been found desirable to create a pneumatic tire in which the reinforcement material contained therein possesses a better than average fatigue life coupled with superior strength.

It is, therefore, the primary object of this invention to provide a pneumatic tire containing reinforcement material that has an increased fatigue life.

Another object of the present invention is to obtain an increased fatigue life in a pneumatic tire by utilizing a highly twisted single yarn.

A further object of the present invention is to provide a pneumatic tire reinforcement yarn that has superior tensile strength coupled with an adequate fatigue life.

An additional object of the invention is to utilize a pneumatic tire reinforcement material that requires only one twist operation, thus decreasing the overall cost.

Heretofore the reinforcement material employed in pneumatic tires has been formed of either staple fibers or continuous filaments. When staple fibers are employed, the conventional method of forming the reinforcement cord has been to form the yarns by twisting each one and then coupling the yarns together by additional twisting to a cord. The cord reached a certain degree of stability since a reverse twist was generally employed when the yarns were twisted into a cord structure. With a staple fiber, twist is necessary since a tensile force in the axial direction has a tendency to pull the fibers apart. An axial load imposed on a twisted cord will reduce the overall cord diameter because of the sheer forces involved. As continuous filaments came into use the conventional manner of twisting filaments into yarns then reverse twisting the yarns into cords was still employed. The present invention eliminates the formation of the tire reinforcement into cords and employs a high twist yarn.

With the above objects in view, the present invention comprises a pneumatic tire and the reinforcement material utilized in fabricating the tire, as illustrated in the accompanying drawings set forth hereinafter.

Further objects and variations will be readily apparent when considered with the specification and claims that follow.

Figure 1:
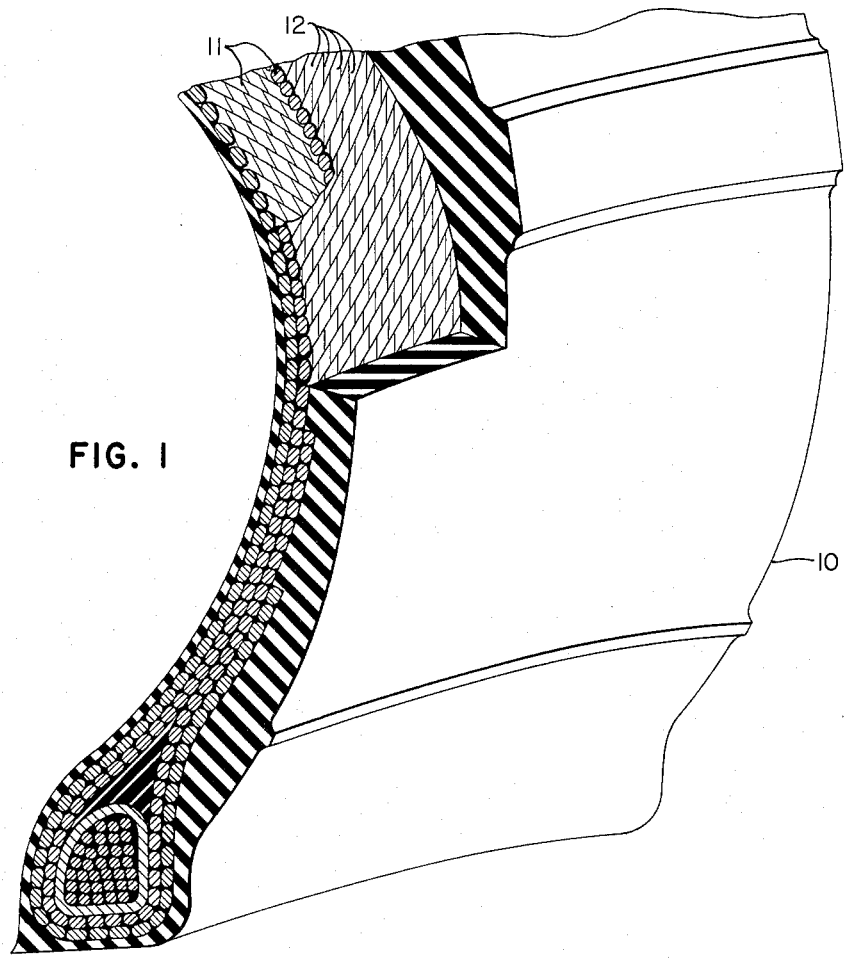
FIG. 1 is a perspective view of tire partly in section to show the cord construction.

FIG. 1 shows a section of a pneumatic tire at 10. The carcass of the tire contains reinforcement layers or plies 11 that are positioned around the toroidal shaped structure. As shown in FIG. 1, plies 11 contain reinforcement yarns 12 that are oriented in parallel relationship within ply 11. Ply 11 is coated with rubber prior to incorporation within the tire carcass.

Figure 2:
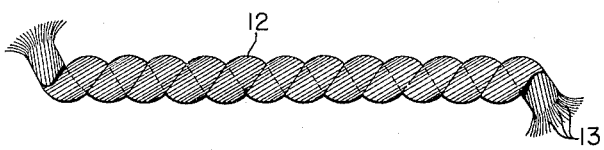
FIG. 2 is an enlarged view of the twisted yarn. The yarn of the present invention is used in rubber coated ply stock which is incorporated into a tire in a conventional manner.

FIG. 2 shows an enlarged view of twisted yarn 12. Yarn 12 is formed by grouping together filaments 13. Individual filaments 13 then carry the load in a continuous path along the length of the yarn. Yarn 12 is preferably composed of a thermoplastic material, such as polyester or other similar material that lends itself well to the formation of long lengths of continuous filamentary material.

In yarns comprised of staple fibers such as cotton the effect of yarn twist on breaking strength is well known. For a low twist certain tensile values are obtained. As the twist is increased, the ultimate tension of the yarn will increase until an optimum twist-strength ratio is attained. An increase in twist beyond the optimum twist, or turns per inch, will only result in lower tension ultimates. The above relationship is somewhat modified for the continuous filamentary material such as nylon and polyester. The continuous filamentary yarns do not require a twist in order to develop their ultimate strength. Twist does become desirable however in introducing other yarn characteristics such as the ability to absorb compression forces and withstand fatigue.

In order to express the desired twist in yarns of different sizes or denier, it is common to use a quantitative index known as a twist multiplier. A twist multiplier that is widely used as an empirical means for establishing proper twist in staple yarns such as cotton is as follows:

$$TM = \frac{T}{\sqrt{C}}$$

where
TM=twist multiplier
T=twist in yarn
C=cotton count

Since tire reinforcement cords and yarns are generally expressed in terms of denier, the above equation can be modified to express denier instead of cotton count. When yarn number conversion tables such as those available in ASTM Standards on Textile Materials are consulted it is apparent that cotton count is in inverse proportion to denier. When the (C) cotton count for a given yarn is 1.0 the corresponding (D) denier is 5315. Thus it is evident that;

$$C \times D = 5315 \text{ or } C = 5315/D$$

thus the twist multiplier for denier becomes $$TM = \frac{T}{\sqrt{\frac{5315}{D}}} = \frac{T\sqrt{D}}{72.9} = 0.01372 T\sqrt{D}$$

The above expression could be expressed equally well without placing it on a comparative basis with cotton count; however, the resulting twist multiplier values would be in the range of three digit figures instead of the familiar one and two digit values.

An additional refinement is desirable in the above set forth twist multiplier formula for denier. The specific gravity of various man-made synthetic fibers varies therefore since denier is defined as grams per 9,000 meters, a heavy yarn would have a smaller diameter thus enabling it to accommodate a higher twist per unit length than a corresponding yarn of equal denier but of less density. Including specific gravity in the expression for twist multiplier results in, $$TM = 0.01372 T\sqrt{\frac{D}{\text{Sp. Gr.}}}$$

Using the above expression for twist multiplier the following examples are shown:

*Example 1*

| | |
|---|---|
| Material | Nylon |
| Denier | 2520 |
| Yarns | 1.0 |
| Sp. Gr. | 1.14 |
| Yarn twist | 8.0 |

$$TM = 0.01372 T\sqrt{\frac{D}{\text{Sp. Gr.}}}$$
$$= 0.01372 \times 8.0 \times \sqrt{\frac{2520}{1.14}}$$
$$= 5.1$$

*Example 2*

| | |
|---|---|
| Material | Polyester |
| Denier | 3300 |
| Yarns | 1.0 |
| Sp. Gr. | 1.38 |
| Yarn twist | 8 |

$$TM = 0.01372 T\sqrt{\frac{D}{\text{Sp. Gr.}}}$$
$$= 0.0132 \times 8.0 \sqrt{\frac{3300}{1.30}}$$
$$= 5.4$$

*Example 3*

| | |
|---|---|
| Material | Rayon |
| Denier | 4950 |
| Yarns | 1.0 |
| Sp. Gr. | 1.52 |
| Yarn twist | 7 |

$$TM = 0.01372 T\sqrt{\frac{D}{\text{Sp. Gr.}}}$$
$$= 0.01372 T \times 7.0 \sqrt{\frac{4950}{\text{Sp. Gr.}}}$$
$$= 5.5$$

The TM values in the above examples produce a reinforcement material that has the required tensile properties coupled with excellent fatigue properties. The table below shows relative tension and fatigue values for an adhesive treated reinforcement material containing varying amounts of twist per inch.

| | |
|---|---|
| Material | Nylon |
| Denier | 2520 |
| Yarns | 1.0 |
| Sp. Gr. | 1.14 |

| Twist per inch | 0 | 2.30 | 3.85 | 6.20 | 8.10 | 10.10 | 12.95 |
|---|---|---|---|---|---|---|---|
| Tension | 46.2 | 46.1 | 45.1 | 44.8 | 41.0 | 29.4 | 27.9 |
| Fatigue | 12 | 27 | 39 | 131 | 134 | 129 | 77 |

The above table shows that with increased twist a single yarn decreases in strength and increases in fatigue until an optimum twist value is attained. It has been found that some tensile strength can be sacrificed in order to take advantage of the maximum fatigue properties of the single twisted yarn.

The continuous nature of filaments 13 permit the high twist to carry the tensile load along the length of the yarn. As the tire is flexed during use the yarns are also required to withstand compressive forces. The yarn must move with the surrounding rubber without suffering permanent damage, as often occurs when a conventional reinforcement cord is subjected to compression. In the high twist cord of the present invention, contraction can occur along the entire yarn length, whereas an ordinary twisted cord will have a tendency to buckle at one location, thus permanently fixing that spot as the point of flexure for future stress reversals.

While certain representative embodiments and details have been shown for the purpose of illustrating the invention, it will be apparent to those skilled in this art that various changes and modifications may be made therein without departing from the spirit or scope of the invention.

What is claimed is:
1. A pneumatic tire having filamentary reinforcement material which is positioned within the carcass thereof in at least one layer in which said material consists of parallel oriented single twisted yarns that are comprised of a plurality of individual load carrying members.
2. A pneumatic tire having thermoplastic filamentary reinforcement material which is positioned within the carcass thereof in at least one layer in which said material consists of parallel oriented single twisted yarns that are comprised of a plurality of individual continuous length load carrying members.
3. A pneumatic tire having thermoplastic filamentary reinforcement material which is positioned within the carcass thereof in at least one layer in which said material consists of parrallel oriented yarns that are comprised of a plurality of individual continuous length load carrying members that are twisted together with a single twist and form a common spiral path about the longitudinal axis of the yarn.
4. The pneumatic tire as set forth in claim 1 in which the yarn has a twist multiplier ratio between 2.75 and 7.00.

5. The pneumatic tire as set forth in claim 1 in which the yarn has a twist multiplier ratio between 4.00 and 6.00.

6. A pneumatic tire having continuous filamentary reinforcement material which is positioned within the carcass thereof in at least one layer in which said material consists of yarns having their respective axes substantially equidistant from each other and comprised of a plurality of continuous length load carrying monofilaments that form a singly twisted substantially constant pitch spiral path about the longitudinal axis of the yarn.

7. The pneumatic tire as claimed in claim 6 wherein the yarn has a twist multiplier ratio between 2.75 and 7.00.

8. The pneumatic tire as claimed in claim 6 wherein the yarn has a twist multiplier ratio between 4.00 and 6.00.

References Cited by the Examiner

FOREIGN PATENTS 568,042 12/1923 France.
512,002 8/1939 Great Britain.

ARTHUR L. LA POINT, *Primary Examiner.*